United States Patent [19]
Schimion et al.

[11] Patent Number: 5,534,155
[45] Date of Patent: Jul. 9, 1996

[54] METHOD FOR PURIFICATION OF COOLING AGENTS AND/OR LUBRICANTS USED IN ROLLING MILLS

[75] Inventors: Werner Schimion, Hilchenbach; Willi Leineweber, Krefeld, both of Germany

[73] Assignee: SMS Schloemann-Siemag Aktiengesellschaft, Dusseldorf, Germany

[21] Appl. No.: 883,827

[22] Filed: May 15, 1992

[30] Foreign Application Priority Data

May 15, 1991 [DE] Germany .......................... 41 15 819.9

[51] Int. Cl.⁶ .................................. B03C 1/30; C02F 1/48
[52] U.S. Cl. .............................. 210/695; 75/430; 75/962; 210/222; 210/223; 210/804
[58] Field of Search .................................. 210/695, 748, 210/749, 222, 223, 804; 75/749, 750, 962, 430

[56] References Cited

U.S. PATENT DOCUMENTS

| | | | |
|---|---|---|---|
| 3,887,74 | 6/1975 | Senfe et al. | 423/150.1 |
| 3,574,329 | 4/1971 | Beavon | 210/794 |
| 4,120,697 | 10/1978 | Coffin et al. | 75/419 |
| 4,234,420 | 11/1980 | Turbeville | 210/401 |
| 4,272,341 | 6/1981 | Lamb | 75/725 |
| 4,995,912 | 2/1991 | Goss et al. | 75/962 |
| 5,047,083 | 9/1991 | Blake et al. | 75/962 |
| 5,147,554 | 9/1992 | Heck | 210/695 |

*Primary Examiner*—Virginia Manoharan
*Attorney, Agent, or Firm*—Anderson Kill Olick & Oshinsky

[57] ABSTRACT

For purification of liquids used for cooling and/or lubrication interspersed with metallic and/or other materials contaminations, especially for separation of rolling scale and of substances containing oil or grease from the industrial process water in open or exposed cooling circulation cycles in the smelting industry, especially in rolling mills, it is proposed to separate the coarse rolling scale by gravity sedimentation from the contaminated process water, to subsequently remove the mid-size and fine rolling scale particles from the process water prepurified in this manner by magnetic separation, to divide by flotation the thus finished clarified or purified process water into fractions containing oil concentrate, water and the finest rolling scale particles carrying little oil, the purified process water is to be used as a cooling agent, the entire rolling scale separated out of the process water is smelted in the form of sinter and the concentrate containing oil is either rejected or subjected to a waste oil purification.

2 Claims, 1 Drawing Sheet

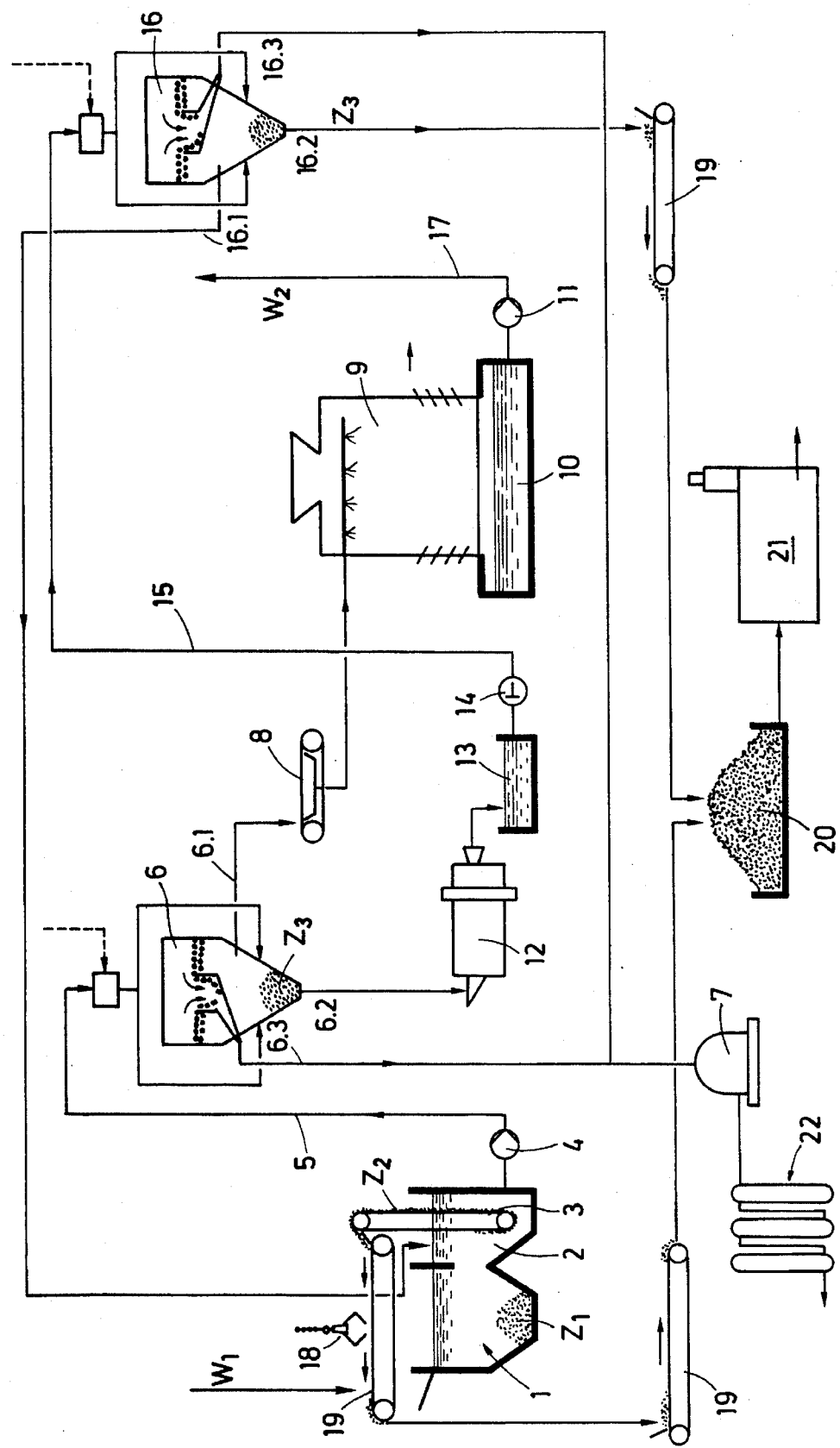

METHOD FOR PURIFICATION OF COOLING AGENTS AND/OR LUBRICANTS USED IN ROLLING MILLS

BACKGROUND OF THE INVENTION

The invention deals with a method for purifying cooling liquids used for cooling and/or for lubricating, that are interspersed or loaded with metallic and/or other material impurities, especially for separation of rolling scale and oily or greasy substances from industrial process or efflux water in open cooling circulation cycles or systems in the iron or steel industry, especially in rolling mills. This invention deals also with a pertinent purification installation or plant for performing the method.

From year to year higher requirements concerning the chip removal output or the shaping output and very high requirements concerning the quality of the surface are specified for the products which are processed by the different processing methods in the machining as well as the non-cutting shaping or deformation technology. The heat generation arising during the chip removal output or during the non-cutting shaping output must be held within limits, for which reason cooling is required in most cases in order to keep the temperatures constant during the processing operation. With the required surface smoothness or quality, care must be taken that particles which have already been removed are rapidly and completely conveyed away from the machining or processing points. Especially in the case of chipless deformation technology, for instance in rolling mills care must be taken that the surfaces do not contain any solid foreign materials in the regions where the shaping tools or the rolls of a rolling stand come in contact with the workpiece, since otherwise these are rolled into the material of the workpiece and the charge involved must possibly be completely scrapped. The cooling and lubricating agents are therefore continuously contaminated with a fine dust or grit from the shaping process. In case of lubricants, aging products are additionally formed. Since these cooling and lubricating agents consequently are continuously enriched by fines or grit and other contaminations, they must be purified. The process behavior and the useful life of these media are considerably improved not only by a thorough and continuous purification of the cooling agents or lubricants, but the overall results of the machining and the chipless forming technology are optimized.

A listing of different individual machines or of individual separation arrangements such as sedimentation tanks, hydrocyclones, centrifuges, separators, band filters, pressure filters, sedimentation filters is enumerated in the Technical Information, 68th year, Vol. 7/8, 1975 dealing with cooling lubricant care and its purification as well as with separation of waste emulsions. However, no pointers are provided as to how these individual machines must functionally interrelate with each other in order to attain optimum purification results, for instance in rolling mills for the open cooling water circulation cycles used there. The diagrams shown in this publication, dealing with a sedimentation filter installation for grinding oil purification or the therein explained diagram of a thermal emulsion separation installation or an ultrafilter installation for separation of emulsions, are not suitable for use in a rolling mill environment.

An installation for purification of liquids or liquors in rolling mills containing contaminants, residues and/or aging products is known from the DE-OS 36 16 426. The contaminated liquids used for cooling and/or lubrication in rolling mills are, to begin with, collected in a collection tank and are plumped from there towards several diaphragm filters which are located in a reverse flushing cycle and are cyclically activated. The filter outputs of the diaphragm filters lead to a presetting tank, from which the purified liquid can be drawn off by means of an initial pump and be directed to its intended use, for instance to a rolling mill to be cooled. A separate precipitation vessel is provided for purifying the highly contaminated liquid passing through the diaphragm filters during the flushing process. The contaminants deposit or accumulate on the highly sloping base of this precipitation vessel and are directed to the lowest point of the base so that they can be conveyed away from there by a drawing off device. Overflow troughs or ducts are provided in the upper region of the precipitation vessel, into which the liquid precleaned by the precipitation can overflow. The liquid collected in the overflow troughs is at least partially pumped back by a pump in a regulated manner to the diaphragm filters and serves there, as a reverse flushing means for cleaning or purifying the diaphragms arranged in the filters. The water management in rolling mills can be largely automated by means of such a purification installation and the cooling agent circulation cycle, characteristically open in rolling mills, can be operated with clearly lower losses.

SUMMARY OF THE INVENTION

Proceeding from such a purification method and purification installation for cooling agents or lubricants in rolling mills, it is an object of the present invention to refine the separation of rolling scale as well as oil and grease from the used industrial process water with the help of space-saving installations which are as efficient as possible, so that not only can the purified water be returned to the rolling mill as a highly impure industrial process water, but the oil/grease can be reused after a purification of waste oils, and the separated rolling scale can be smelted without any difficulties.

Pursuant to this object, and others which will become apparent hereafter, one aspect of the present invention resides in a method for purifying industrial process water in open cooling circulation cycles, having the following features: the coarse rolling scale is separated from the contaminated process water by means of gravity sedimentation; and the rolling scale particles of average or finer size are removed from the process water prepurified in the above manner preferably by magnetic separation. The thus finely clarified process water or effluent is subjected to flotation and separated into fractions containing oil concentrates, water and very fine rolling scale particles containing little oil. The individual fractions, such as the clarified process water are reused as cooling agents and the entire rolling scale separated from the process water is smelted as iron sinter. The oil-rich concentrates are either discarded or subjected to a waste oil purification.

The inventive method is performed in a purification installation according to the invention by a precipitation tank for the supply of used and contaminated process water as well as a device for removal of sedimented coarse rolling scale, and a device for the transfer of the preclarified process water into a presetting tank with an additional solid material separator installed therein, this is preferably a magnetic separator for average and fine rolling scale particles, as well as a device for transfer of the finish-clarified process water into a flotation apparatus with forced or positive aeration or cooling, whose fraction outlets are provided with conveyance means for return of the fractionalized products such as process water into the cooling cycle of the rolling mill and for transfer of the separated rolling scale into a smelting or metallurgical plant as well as for transfer of the filtrate containing oil into a waste oil purification apparatus.

It is achieved by the present invention to separate the industrial process water interspersed primarily by rolling scale and oil-containing up to grease-containing substances into extraordinarily pure fractions. This is accomplished at a reduced cost in a compact purification plant. These fractions include pure water which is returned as industrial process water into the open or exposed cooling cycle of the rolling plant and into rolling scale which is largely free of substances containing oil to such an extent that it can be directly fed to the sinter belt and into the smelting or metallurgical plant, without jeopardizing the electric filters which are normally located downstream of such an installation. The concentrate-containing oils, meaning the waste oil emulsion largely devoid of solid materials and merely binding certain $H_2O$ shares, can be directly fed to a waste oil purification apparatus and thereafter be directed to various specific utilization modes.

The essential advantage of the invention lies consequently in that the formation of the rolling scale sludges containing oil and hitherto separated out of the water circulation cycles in rolling mills are completely eliminated. It is well known that these rolling scale sludges, containing from 20 to 30% of oil shares which accumulate in conventional cleaning procedures and which hitherto were dumped, present a considerable load on the environment.

A clear saving of installation cost is achieved in the invention by the circumstance that in the last stage of the industrial process water purification a much less costly flotation apparatus is now used instead of the conventional very fine purification by means of expensive gravel bed filters.

The convincing economy of the inventive method and purification plant can also be seen in that the accumulating rolling scale containing 1 to 3% of steel throughput is limited to residual oil contents of approximately 0.1% and can be quantitatively returned into the smelting process.

In a method of a different type described in European Patent 0 080 589 it has indeed been proposed to detach the fatty substances from the solid materials in oil contaminated rolling scale sludges by breaking-up the solid materials to grain sizes under 1 mm, wherein these are subjected to a solid body mechanical stress, then are washed in flotation, wherein the committed solid materials are separated out of the underflow flotation and are dried in a dehydrating manner, and wherein the overflow liquor obtained at the overflow of the flotation process, which has been subsequently freed from the fatty substances, is returned to the purification process. We are dealing here with the purification or dressing of already generated rolling scale sludges, which are deposited in dumps. The method of the invention prevents the formation of such oily rolling scale sludges from the start.

In a further embodiment of the invention, the clear water obtained from the flotation process is filtered and subsequently sprayed in a cooling tower and collected and returned to the point of use in the rolling mill. Installation technology-wise, the fraction outlet of this flotation apparatus for clear process water is in this case possibly connected with the filter, whose filter output is connected to a cooling tower and with a pump collection or header tank arranged thereunder, whose pump is in connection with a cooling water user in the rolling mill through connection lines. The repeated filtering of the clear water from the flotation apparatus is indicated if any sort of operational malfunction with solid material penetrations should occur in the flotation cells. By spraying the clear water in a cooling tower, large quantities of water can be very steeply cooled, as is required in rolling mills, where for instance circulating water quantities of 5000 $m^3$/h must be very quickly cooled from about 50° C. to 30° C.

It is provided in a particularly advantageous embodiment of the invention that the rolled scale particles containing little oil separated in the flotation process are ground up and suspended in water. The suspension is then separated into fractions in a secondary flotation, containing oil concentrate, water and very fine rolling scale particles. This is accomplished by the fraction outlet of the flotation apparatus for separated rolled scale particles being connected to a comminution machine, especially to a mill, whose product outlet is connected to a suspension tank, whose suspension line is conducted to a second flotation cell with positive aeration or cooling. Mechanical processing of the scale particles occurs, among other things, in the mill whereby the adhering oil particles are entirely detached or can be more easily separated in a suspension tank located downstream. Detergents such as tenside, surfactant, or the like can be expediently added at that point. The thus prepared suspension can be separated in a particularly simple manner by means of subsequent flotation into the three named fractions.

In a further development of the claimed method and purification plant, the concentrate-containing oil emanating from the initial flotation of the process water and the concentrate-containing oil emanating from the finer flotation of the suspension are separated into several material phases especially into the fractions with oil, water and small shares of rolling scales. From a plant technology point of view this is achieved by connecting the fraction outlet of the concentrate containing oil of the first flotation apparatus and/or the second flotation apparatus with a centrifuge, especially with a three-phase separator with outlet apertures for purified water, waste oil as well as solid materials. In this way flowable waste oil in separated from the water purification process, which can be filled into oil barrels and can easily be temporarily stored, before it is transported into a waste oil dressing or purification plant, or can again be used in the rolling mill.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE schematically illustrates the present invention.

DETAILED DESCRIPTION OF THE PREFERRED EMBODIMENTS

At the outset, the following technical background will be provided. The largest quantities of scale accumulate especially in rolling mills with continuous casting installation, where simultaneously large quantities of exposed or open cooling water are used. The rolling scale is formed by oxygen in the air combining with iron. The scale is composed of the different forms of iron oxide FeO, $Fe_2O_3$ and $Fe_3O_4$. The iron content amounts to 70 to 75%. In continuous casting and rolling mills sawdust, oxyacetylene cutting and scale oxidation must be added to the scale losses. In continuous casting plants the scale is obtained over a distance from the ingot mold up to the loading arrangements. In large blooming mill trains in hot rolling mills the scale is obtained in the form of large flat cakes and so-called fish. On roller tables and cooling beds it is obtained in the form of small plates and pellets down to grain sizes of a few thousandths of a millimeter. The scale obtained in rolling mills always amounts to 1 to 3% of the rolled material which has been put through or processed. The cooling water supplied to the rolling process is simultaneously used in an advantageous manner as a conveyor means for the accumulating rolling scale and other solid materials and for washing away the lubricants utilized, approximately 2 liters of oil or grease per ton of rolled steel. For collecting the used industrial process water, scale ducts or channels are usually arranged in the foundation, which have an appropriate gradient or slope in order to achieve a good scouring or washing away effect.

The highly contaminated process water $W_1$ flowing in the scale channels is, to begin with, supplied according to the invention to a sedimentation tank 1 arranged externally of the rolling mill proper. A coarse purification occurs in the sedimentation tank 1 by large scale flat cakes and scale fish as well as large particles of the flame cutting and scale oxidation accumulating on the bottom of the sedimentation tank. In this sedimentation tank 1 the coarse rolling scale $Z_1$ with an average diameter larger than 0.5 mm is separated to the extent of 80% from the process water by the action of gravity. The separated coarse rolling scale is decidedly low in oil content. It is from time to time lifted out of the sedimentation tank 1 by a crane installation 18 shown diagrammatically, and is supplied by a conveyor belt 19 to a smelting or metallurgical plant 21.

In the course of a second purification step the process water, which has been coarse clarified in the sedimentation tank 1, flows subsequently through a magnetic separator 3 installed in a downstream pump collection or header tank. In a smooth-as-possible zone of the pump header tank 2, the average and fine rolling scale particles $Z_2$ between 0 and 0.5 mm diameter are separated by means of the magnetic separator 3 from the process water with a separation efficiency of 50 to 80% and are scraped or wiped off the magnetic separator above the water level. The mid-size and fine rolling scale particles can still be classified as containing little oil and can therefore together with the coarse rolling scale from the sedimentation tank 1 be supplied by means of the conveyor belt 19 to the smelting plant 21 after being drained in a drainage tank 20. Due to the low oil content in the coarse rolling scale as well as the mid-size and fine rolling scale particles obtained through magnetic separation, there is no danger during the smelting process that electric filters used for dust removal in such installations will be affected. The low share of oil-containing substances in the rolling scale $Z_1$ and $Z_2$ in the first few purification stages results from the circumstance that the oily phase does not adhere to rolling scale particles which have a relatively large surface. Thus, during the transfer of the precleaned industrial process water from the first sedimentation stage into the second purification stage with magnetic separation, no appreciable turbulence; can be allowed to arise, so that the oily phase cannot adhere to the rolling scale particles.

The process water contaminated with oil and grease and still interspersed with specific shares of fine rolling scale particles as well as with very fine rolling scale particles (grain size of approximately 0.001 mm) is subsequently conveyed out of the collection or header tank 2 by pumps 4 through a line 5 to a flotation apparatus 6 located above the level of the smelter. The finish clarified process water in the flotation apparatus 6 is separated into fractions of oil concentrates, water, and scale particles with very little oil. In order to achieve this, the process water and materials it contains flow with positive guidance through the flotation apparatus 6, wherein air is added in as fine a dispersion as possible. The finest particles as well as oil contained in the process water adhere to or are deposited on the finely dispersed air bubbles, in order to float to the top together with these. A bubbly foam is obtained which is continuously drawn off and removed from the upper region of the flotation cell through an adjustable annular space. Various reagents can be added for assisting the flotation process, if necessary.

The thus obtained oil concentrate flows through a line 6.3 into a separator 7. In this three-phase separator 7 the product supplied is separated into fractions of waste oil, water and extremely slight shares of the most fine rolling scale. The process water clarified in the flotation apparatus 6 is directed through the line 6.1 having a gradient through a gravity filter 8 utilized as a final filter, which is to fulfill its filtering tasks only if the degree of separation cannot be precisely achieved in the flotation apparatus 6, and solid materials pass into the process water which as such has been purified or clarified. After the gravity filter 8, the clarified process water is directed to a cooling tower installation 9 where the water is sprayed, cooled and collected in the pump collection or header tank 10 located below the cooling tower. During this cooling process the water sprayed throughout the cooling tower is cooled down to the required operational temperature. The clarified industrial process water $W_2$ is again conveyed back from the pump collection tank 10 by the pump 11 and the line 17 to the users in the rolling mill.

The fine to finest rolling scale with the particle size of between 0.001 mm to 0.5 mm separated to the extent of 90 to 95% in the flotation apparatus from the process water is collected in the underflow 6.2 of the flotation apparatus 6 and from there is supplied to a mill 12. The rolling scale containing oil is ground up in the mill and is herein exposed to shear forces among others. The product obtained thereby arrives into a suspension tank 13 enriched with water, where the oil phase can again separate from the rolling scale particles. The suspension is introduced by means of a positive action pump 14 and a pipeline 15 into a second flotation apparatus 16 for final flotation. In the flotation apparatus 16 the suspension is separated into three fractions by means of a process described in connection with the flotation apparatus 6. The oil concentrate accumulating therein is supplied to the separator 7 through a pipeline 16.3 and is divided in the separator, as has been described previously, into waste oil, water and smallest shares of the most fine rolling scale. The water clarified in the flotation apparatus 16 is sent by gravity through a pipeline 16.1 to the pump collection tank 2. This quantity of water, which can correspond to the quantity of water lost, is thus returned into the water purification circulation cycle. The finest oil-poor rolling scale $Z_3$ in the; underflow 16.2 of the flotation apparatus 16 is drawn off from there and arrives together with the remaining rolling scale $Z_1$ from the sedimentation tank 1 and the rolling scale $Z_2$ from the pump collection tank 2 onto the sinter belt 19 and from there, after it has been drained in the drainage tank 20, into the smelting or metallurgical installation 21.

Not only can rolling scale generated in considerable quantities be directed to an economic use by means of the described method and the associated installation for purification of the greatly contaminated industrial process water accumulating in rolling mills, but also the lubricating oil and lubricating grease used in significant quantities in the rolling process can be recovered in the shape of waste oil and can be directed to other usages. It has to be particularly emphasized, that the dumping and waste disposal problems with rolling scale sludges containing oil, as they accumulate in conventional process water purification methods, does not even arise in the performance of the method in the invention.

While the invention has been illustrated and described as embodied in a method and apparatus for purifying cooling agents and lubricants used in rolling mills, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A method of separating rolling scale and substances containing oil or grease from industrial water flowing in open circulation lines of rolling mills, said method comprising the steps of:

separating rolling scale particles having a diameter larger than 0.5 mm from industrial water by gravity sedimentation;

thereafter, separating rolling scale particles having a diameter less than 0.5 mm from the industrial water by magnetic separation;

thereafter, separating by flotation the industrial water into fractions containing oil concentrate, water and rolling scale particles remaining after magnetic separation;

grounding the separated by flotation rolling scale particles and suspending the grounded rolling scale particles in water to form a suspension;

separating by flotation the suspension into fractions containing oil concentrate, water and grounded rolling scale particles containing oil;

utilizing water as a cooling agent;

separating the oil concentrate into waste oil, water and rolling scale particles containing oil; and smelting all of separated rolling scale particles for producing a metal.

2. A method according to claim 1, wherein said step of separating by flotation the industrial water into fractions includes supplying into a flotation apparatus a finely dispersed air for forming air bubbles on which oil and fine rolling scale particles accumulate.

* * * * *